United States Patent
Chang et al.

(10) Patent No.: US 11,029,772 B1
(45) Date of Patent: Jun. 8, 2021

(54) TRANSPARENT CONDUCTIVE LAMINATED STRUCTURE INCLUDING A FIRST CONDUCTIVE FILM AND FIRST ADHESIVE LAYER DISPOSED ON THE FIRST CONDUCTIVE FILM AND TOUCH PANEL

(71) Applicant: Cambrios Film Solutions Corporation, Tortola (VG)

(72) Inventors: Yung-Cheng Chang, Toufen (TW); Chia-Sheng Liao, Taipei (TW); Chung-Chin Hsiao, Hsinchu County (TW)

(73) Assignee: Cambrios Film Solutions Corporation, Tortola (VG)

( * ) Notice: Subject to any disclaimer, the term of this patent is extended or adjusted under 35 U.S.C. 154(b) by 0 days.

(21) Appl. No.: 16/934,215

(22) Filed: Jul. 21, 2020

(51) Int. Cl.
*G06F 3/041* (2006.01)

(52) U.S. Cl.
CPC .... *G06F 3/041* (2013.01); *G06F 2203/04103* (2013.01)

(58) Field of Classification Search
CPC .............. G06F 3/041; G06F 2203/04103
See application file for complete search history.

(56) References Cited

U.S. PATENT DOCUMENTS

| 10,324,352 | B2* | 6/2019 | Mansky | G02F 1/13439 |
| 10,749,048 | B2* | 8/2020 | Allemand | B82Y 10/00 |
| 2004/0191509 | A1* | 9/2004 | Kishioka | C09J 7/10 |
| | | | | 428/354 |
| 2004/0265602 | A1* | 12/2004 | Kobayashi | B32B 27/36 |
| | | | | 428/458 |
| 2014/0134434 | A1* | 5/2014 | Park | C08F 220/10 |
| | | | | 428/355 AC |
| 2015/0129290 | A1* | 5/2015 | Seong | H05K 3/046 |
| | | | | 174/257 |
| 2015/0315346 | A1* | 11/2015 | Lee | C09J 175/00 |
| | | | | 428/447 |
| 2016/0002502 | A1* | 1/2016 | Kwon | B32B 7/12 |
| | | | | 428/355 EP |
| 2016/0189825 | A1* | 6/2016 | Woo | H01B 13/0026 |
| | | | | 428/447 |
| 2017/0228090 | A1* | 8/2017 | Nakamura | G06F 3/0445 |

* cited by examiner

*Primary Examiner* — Chun-Nan Lin
(74) *Attorney, Agent, or Firm* — Cooper Legal Group, LLC

(57) ABSTRACT

A transparent conductive laminated structure and touch panel are disclosed. The transparent conductive laminated structure comprises a first conductive film including a first surface and a second surface opposing the first surface. A first adhesive layer is disposed on the first surface of the first conductive film, and a protective film is disposed on the first adhesive layer. A peeling strength between the first adhesive layer and the first conductive film is greater than a peeling strength between the first adhesive layer and the protective film.

16 Claims, 11 Drawing Sheets

TRANSPARENT CONDUCTIVE LAMINATED STRUCTURE INCLUDING A FIRST CONDUCTIVE FILM AND FIRST ADHESIVE LAYER DISPOSED ON THE FIRST CONDUCTIVE FILM AND TOUCH PANEL

BACKGROUND

1. Field of the Disclosure

The present disclosure relates to a transparent conductive laminated structure and a touch panel. More particularly, the present disclosure relates to a transparent conductive laminated structure for manufacturing the touch panel.

2. Description of Related Art

Recently, the application of touch panels is becoming more extensive. More and more electronic products are equipped with touch panels to provide the functions of direct operation or issuing commands for making those electronic products user-friendly. Therefore, the quantity demand for touch panels continues to increase.

In the current preparation process of touch panels, it is necessary to apply adhesives on the exposed surfaces of the components for attaching other components when laminating various layered components. Also, in the preparation process, the assembly steps are usually performed at different times or in different places. Therefore, when moving the unfinished touch panels or components, protective films or release films are applied on the exposed surfaces of the unfinished parts to avoid damage caused by collisions during transportation. Accordingly, in the preparation process of the touch panel, the steps of removing the protective films or the release films and applying adhesives for attaching components are repeated, resulting in the preparation process being complicated, time-consuming, and expensive. Therefore, the structure and the preparation process need to be further improved.

SUMMARY

The main object of the present disclosure is to provide a novel transparent conductive laminated structure and a novel touch panel having a simplified manufacturing process and a lower preparation cost and being environmentally friendly.

The transparent conductive laminated structure of the present disclosure comprises a first conductive film comprising a first surface and a second surface opposing the first surface; a first adhesive layer disposed on the first surface of the first conductive film; and a protective film disposed on the first adhesive layer, wherein a peeling strength between the first adhesive layer and the first conductive film is greater than a peeling strength between the first adhesive layer and the protective film.

In one embodiment, the peeling strength between the first adhesive layer and the first conductive film is 100 times or more greater than the peeling strength between the first adhesive layer and the protective film.

In one embodiment, the peeling strength between the first adhesive layer and the protective film is less than 200 mN/25 mm.

In one embodiment, the first conductive film comprises a first substrate and a first conductive layer disposed on the first substrate, and the first adhesive layer is disposed between the first substrate and the protective film or between the first conductive layer and the protective film.

In one embodiment, the first conductive film comprises a plurality of silver nanowires.

In one embodiment, the transparent conductive laminated structure further comprises a second adhesive layer disposed on the second surface of the first conductive film; and a release film disposed on the second adhesive layer, wherein a peeling strength between the second adhesive layer and the first conductive film is greater than a peeling strength between the second adhesive layer and the release film.

In one embodiment, the first conductive film comprises a first substrate and a first conductive layer disposed on the first substrate, the first adhesive layer is disposed between the first substrate and the protective film, and the second adhesive layer is disposed between the first conductive layer and the release film.

In one embodiment, the peeling strength between the second adhesive layer and the first conductive film is 100 times or more greater than the peeling strength between the second adhesive layer and the release film.

In one embodiment, the peeling strength between the second adhesive layer and the release film is less than 200 mN/25 mm.

The touch panel of the present disclosure comprises a first conductive film comprising a first substrate and a first conductive layer disposed on the first substrate; a second conductive film disposed beneath the first conductive film and comprising a second substrate and a second conductive layer disposed on the second substrate; and a first adhesive layer disposed between the first conductive film and the second conductive film and contacting the first conductive film and the second conductive film, wherein a peeling strength between the first adhesive layer and the first conductive film is greater than 15000 mN/25 mm.

In one embodiment, the touch panel further comprises a protective film; and a third adhesive layer disposed between the second substrate and the protective film, wherein a peeling strength between the third adhesive layer and the second substrate is greater than a peeling strength between the third adhesive layer and the protective film.

In one embodiment, the peeling strength between the third adhesive layer and the second substrate is 100 times or more greater than the peeling strength between the third adhesive layer and the protective film.

In one embodiment, the peeling strength between the third adhesive layer and the protective film is less than 200 mN/25 mm.

In one embodiment, the first conductive film and the second conductive film respectively comprise a plurality of silver nanowires.

In one embodiment, the first conductive film and the second conductive film are patterned electrode layers.

In one embodiment, the touch panel further comprises an optical adhesive and a passivation layer, wherein the passivation layer is attached to the first conductive film by the optical adhesive.

It should be noted that the term "on" in the specification may be used herein to describe the relative positions between components. For example, a first component being disposed on a second component comprises embodiments in which the two components are formed in direct contact, and may also comprise embodiments in which additional components may be formed between the two components.

Furthermore, the terms "first", "second", "third", and the like in the specification may be used herein for ease of description and are not related to the numbers or the orders. For example, "first adhesive layer" and "second adhesive layer" can both be realized as an "adhesive layer".

In the field of the present disclosure, the adhesive layer for attaching the protective film or the release film is usually be removed simultaneously and the substrate or the conductive layer are exposed during the preparation process. In the present disclosure, however, in the step of removing the protective film or the release film, the adhesive layer for attaching the protective film or the release film remain on the substrate or the conductive layer of the conductive film and can be used as adhesive for attaching other components onto the conductive film. Therefore, the step of coating an adhesive on the conductive film can be omitted.

DETAILED DESCRIPTION OF THE PREFERRED EMBODIMENT

Figure 1:
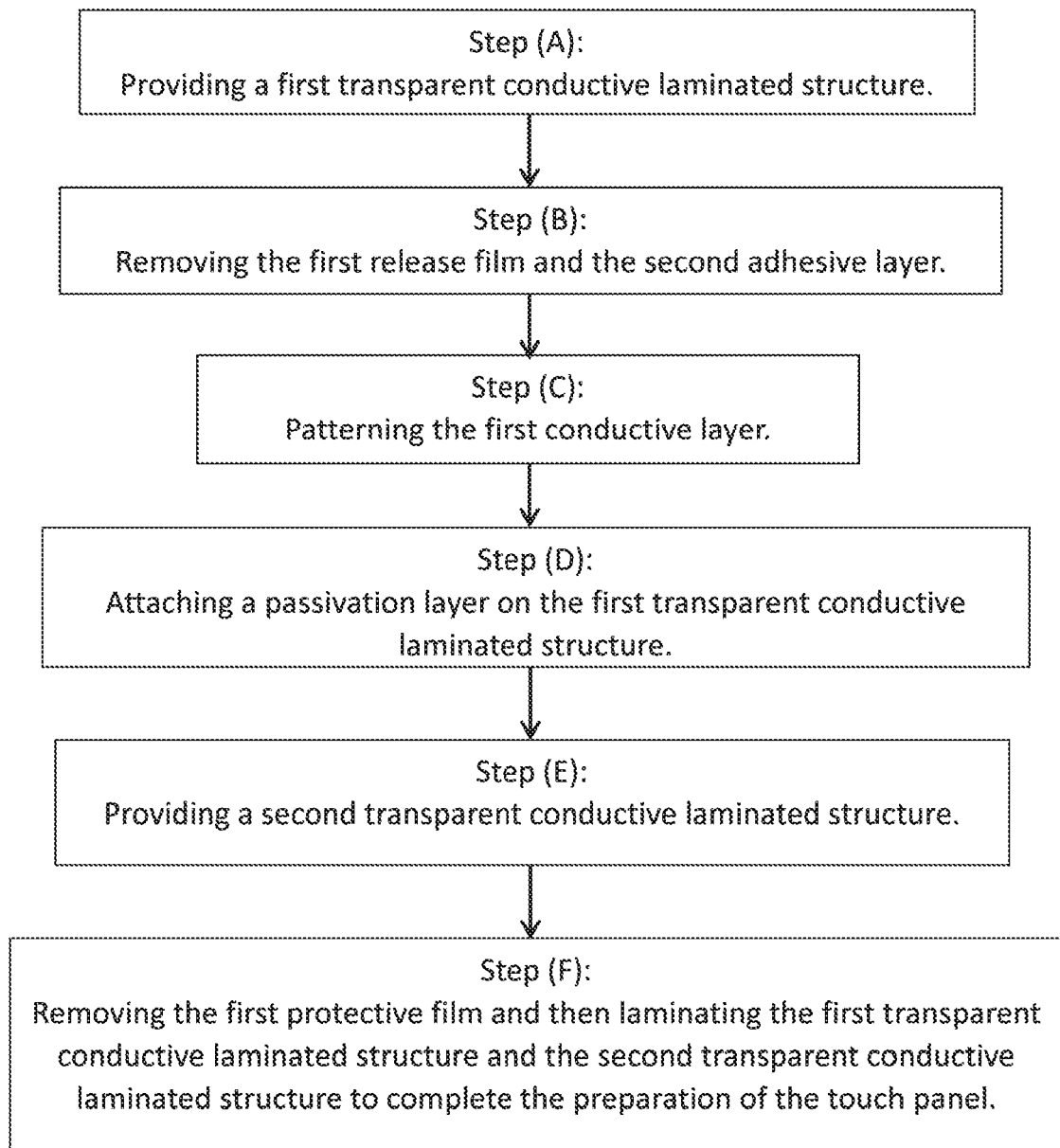
FIG. 1 is a preparation flowchart of the touch panel of the first embodiment of the present disclosure.
Figure 2:
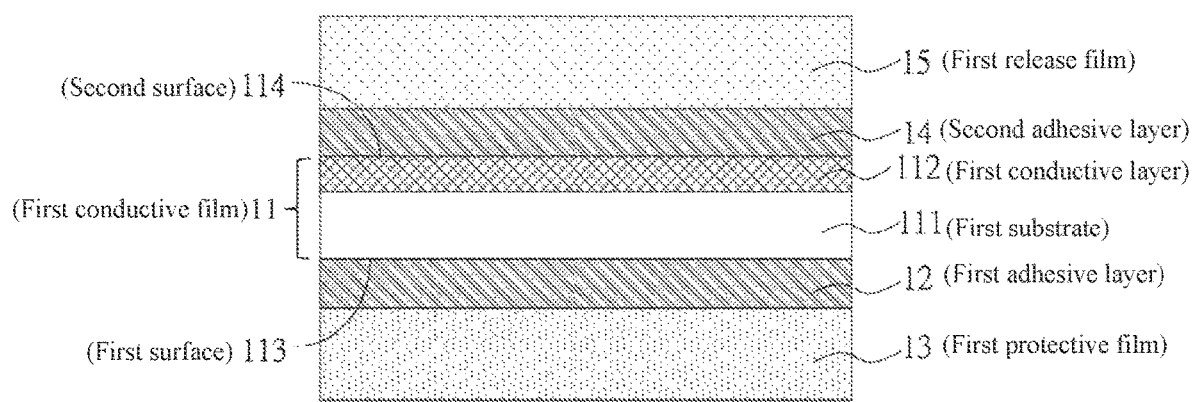
FIG. 2 is a sectional view of the first transparent conductive laminated structure of the first embodiment of the present disclosure.

First, the preparation method of the touch panel 1000 of the first embodiment comprises the following steps. Please also refer to the flow chart illustrated in FIG. 1 and the schematic diagram illustrated in FIG. 2 to FIG. 5.

Step (A) is providing a first transparent conductive laminated structure 1001. The first transparent conductive laminated structure 1001 illustrated in FIG. 2 mainly comprises a first conductive film 11, a first adhesive layer 12, a first protective film 13, a second adhesive layer 14, and a first release film 15.

In the present embodiment, the first conductive film 11 comprises a first substrate 111, a first conductive layer 112, a first surface 113, and a second surface 114. The first substrate 111 provides mechanical support or protection to the first conductive layer 112 and can be a rigid transparent substrate or a flexible transparent substrate. The material of the first substrate 111 may be but is not limited to glass, sapphire, polymethyl methacrylate (PMMA), polyvinyl chloride (PVC), polypropylene (PP), polyethylene terephthalate (PET), polyethylene naphthalate (PEN), polycarbonate (PC), Polystyrene (PS), polyimide (PI), or the like. The first conductive layer 112 comprise materials know in the art, such as metal nanowires (silver nanowires), transparent conductive films (ITO, IZO, etc.), or metal meshes. The first conductive layer 112 may be a patterned or un-patterned conductive layer. In the present embodiment, the first conductive layer 112 is an un-patterned conductive layer constituted by a plurality of silver nanowires (SNW) formed on the first substrate 111. The first surface 113 is the exposed surface of the first substrate 111, and the second surface 114 is the exposed surface of the first conductive layer 112. In other embodiments, the first conductive layer 112 can further comprise an overcoat (not shown in figures) formed on the silver nanowires and protecting the silver nanowires to improve the durability of the silver nanowires.

The first adhesive layer 12 is utilized for attaching the first protective film 13 onto the first surface 113 of the first conductive film 11. The first adhesive layer 12 is disposed between and contacts with the first substrate 111 and the first protective film 13 for providing the adhesion. The peeling strength between the first adhesive layer 12 and the first substrate 111 of the first conductive film 11 is greater than the peeling strength between the first adhesive layer 12 and the first protective film 13. Specifically, the peeling strength between the first adhesive layer 12 and the first substrate 111 is greater than 15000 mN/25 mm; the peeling strength between the first adhesive layer 12 and the first protective film 13 is less than 200 mN/25 mm.

The first protective film 13 protects the surface of the first substrate 111 of the first conductive film 11 from damage caused by collision or contamination during transportation or before processing. The material of the first protective film 13 may usually be flexible materials used as protective films known in the art. For example, the material of the first protective film 13 may be but is not limited to polyester, polyethylene terephthalate (PET), polybutylene terephthalate, polymethyl methacrylate (PMMA), acrylic resin, polycarbonate (PC), polystyrene, polyvinyl chloride (PVC), polyvinyl alcohol, polyvinylidene chloride, polyethylene, ethylene-vinyl acetate copolymer, polyurethane, cellophane, polyolefin, cycloolefin copolymer (COP), polytetrafluoroethylene (PTFE), or mixtures thereof, as long as the peeling strength between the first protective film 13 and the first adhesive layer 12 is less than the peeling strength between the first adhesive layer 12 and the first substrate 111, that is, as long as the peeling strength between the first protective film 13 and the first adhesive layer 12 is less than 200 mN/25 mm.

The second adhesive layer 14 is utilized for attaching the first release film 15 onto the second surface 114 of the first conductive film 11. The second adhesive layer 14 is disposed between the first conductive layer 112 and the first release film 15 for providing the adhesion. In the present embodiment, the second adhesive layer 14 may be optical glue or a water-based glue known in the art as long as the second adhesive layer 14 is releasable from the first conductive layer 112 and is not releasable from the first release film 15.

The first release film 15 is similar to the first protective film 13 and may be made of flexible materials. The first release film 15 protects the surface of the first conductive layer 112 of the first conductive film 11 from damage caused by collision or contamination during transportation or before processing. The material of the first release film 15 is similar to the first protective film 13, and the same description need not be repeated.

Figure 3:
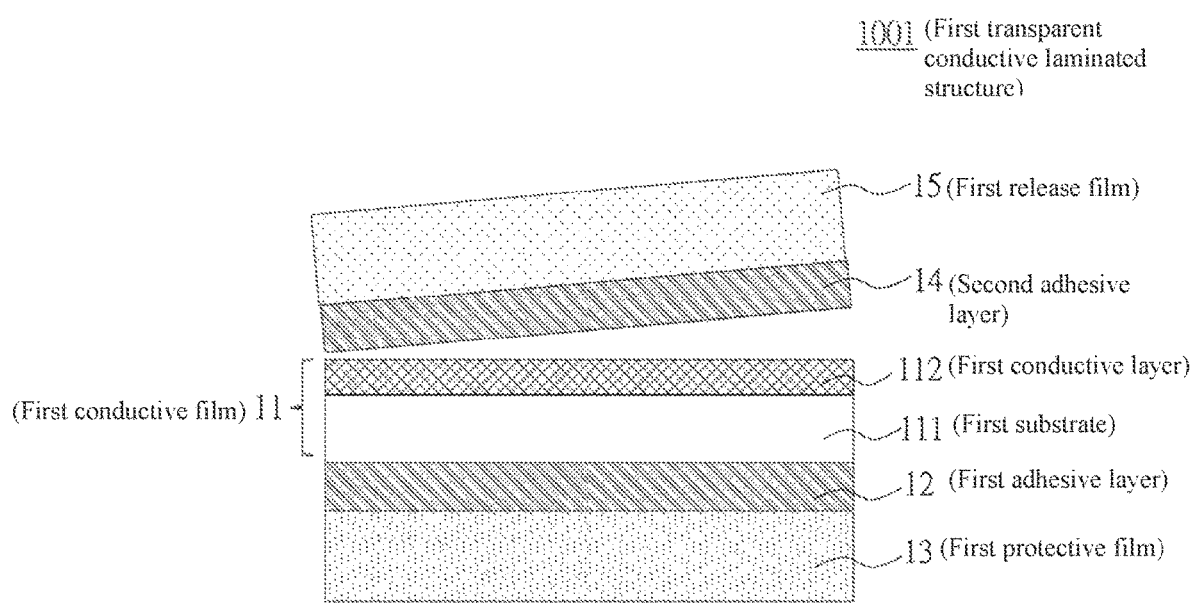
FIG. 3 is a sectional view of the first transparent conductive laminated structure of the first embodiment of the present disclosure.

Please refer to FIG. 3, wherein step (B) is removing the first release film 15 and the second adhesive layer 14. In the present embodiment, the second adhesive layer 14 is detached from the first conductive layer 112 with the first release film 15 when removing the first release film 15 because the second adhesive layer 14 is releasable from the first conductive layer 112 and is not releasable from the first release film 15. The first conductive layer 112 is exposed after the first release film 15 and the second adhesive layer 14 are removed.

Figure 4:
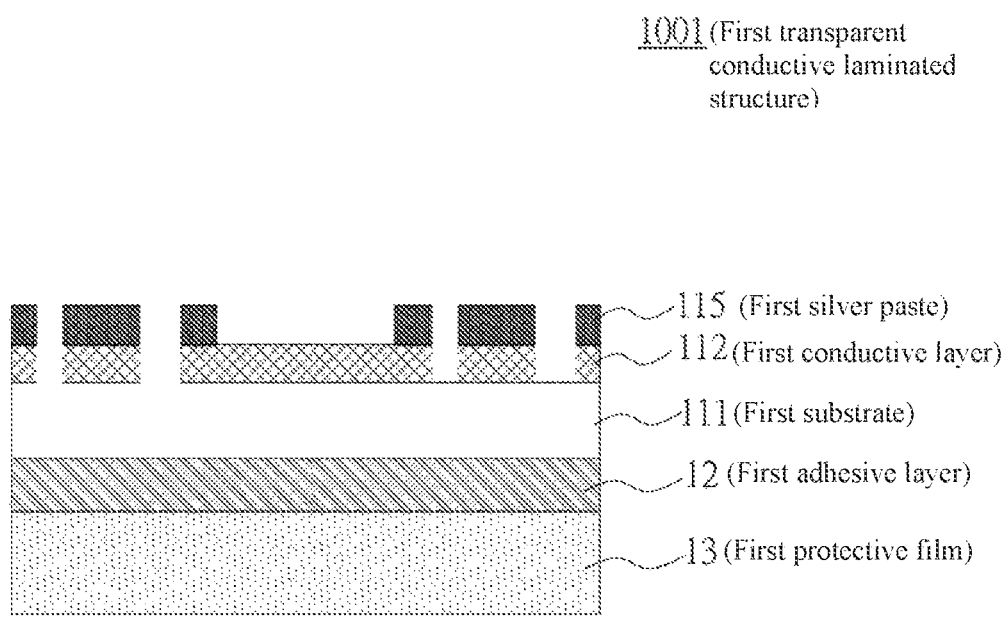
FIG. 4 is a sectional view of the first transparent conductive laminated structure of the first embodiment of the present disclosure.

Please refer to FIG. 4, wherein step (C) is patterning the first conductive layer 112. The patterning process for patterning the first conductive layer 112 is performed by a laser patterning method. However, the present step may further comprise forming a first silver paste 115 on the first conductive layer 112 by screen printing and curing, then patterning the first silver paste 115 and the first conductive layer 112 together via laser patterning.

Figure 5:
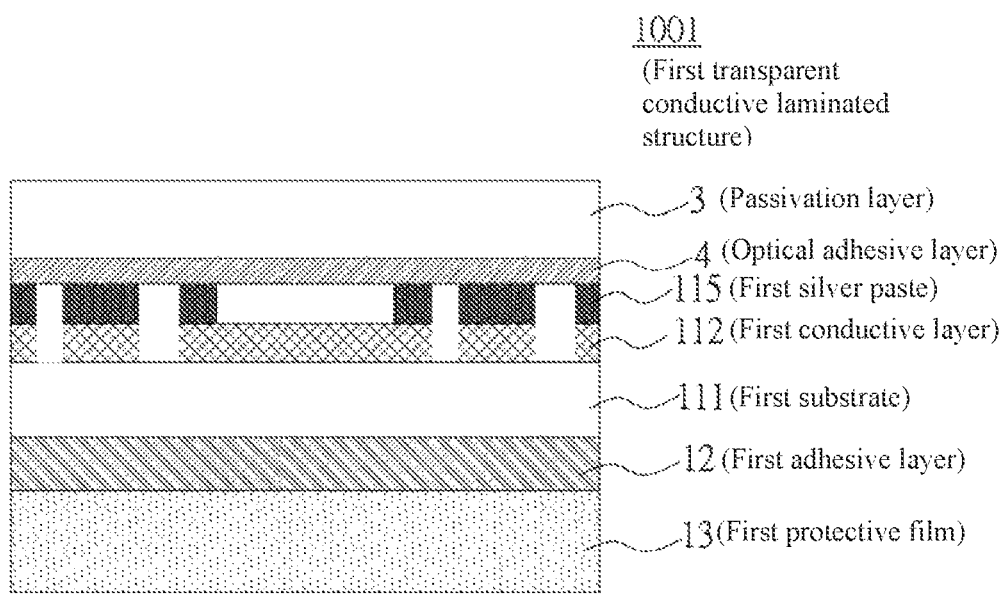
FIG. 5 is a sectional view of the first transparent conductive laminated structure of the first embodiment of the present disclosure.

Please refer to FIG. 5, wherein step (D) is attaching a passivation layer 3 on the first transparent conductive laminated structure 1001. The passivation layer 3 is attached to the patterned first conductive layer 112 and the first silver paste 115 via an optical adhesive layer 4 for providing protection. The optical adhesive layer 4 may be any kind of optical glue known in the art as long as the passivation layer 3 may be firmly attached to the first transparent conductive laminated structure 1001. The passivation layer 3 may be a glass plate, a plastic plate, a sapphire plate, or a surface-reinforced substrate (e.g., reinforced on six surfaces or reinforced merely on an upper surface and a lower surface). The purpose of attaching the passivation layer 3 is to protect against damage to the internal structure of the touch panel 1000 when the user presses the touch panel 1000.

Figure 6:
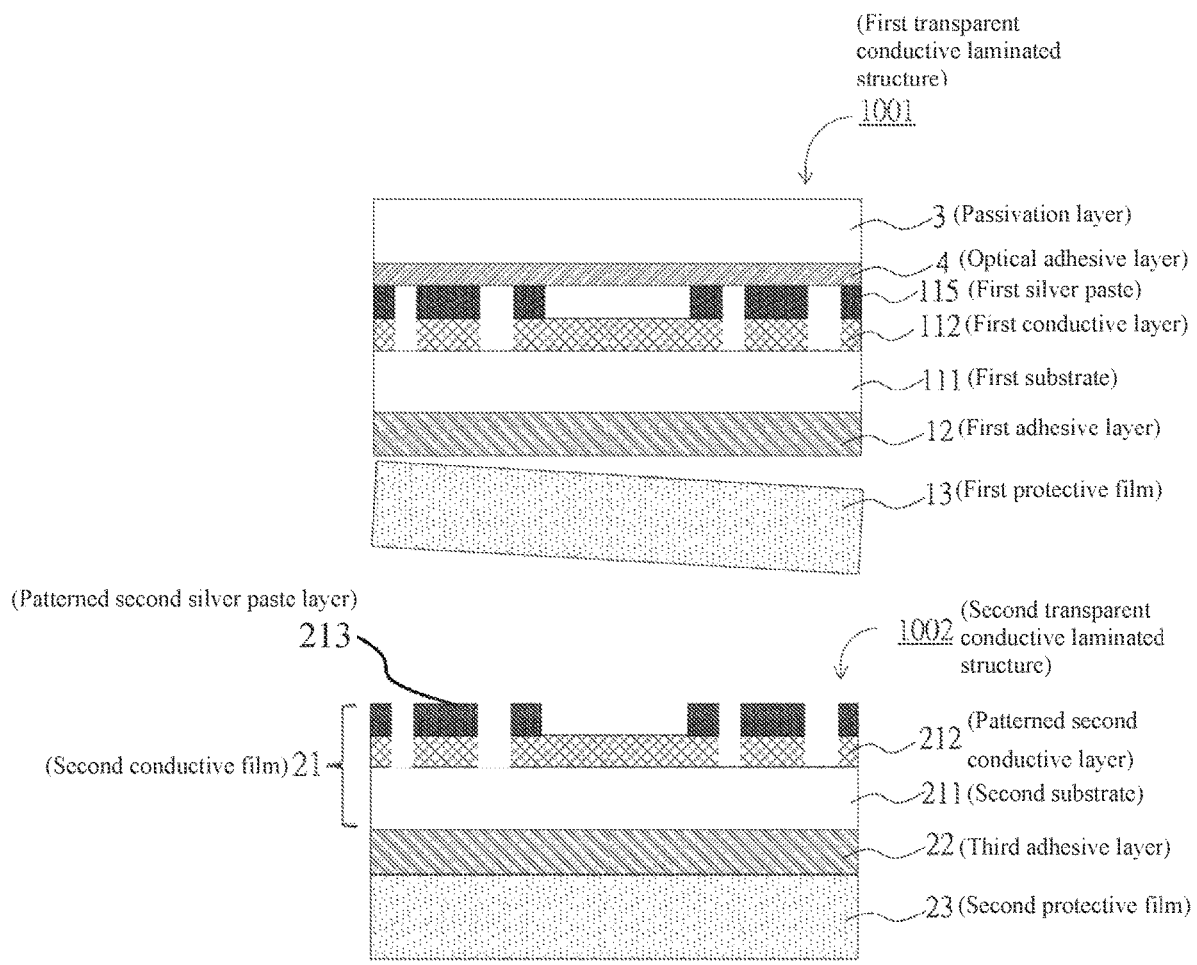
FIG. 6 is a sectional view of the first transparent conductive laminated structure and the second transparent conductive laminated structure of the first embodiment of the present disclosure.

As shown in FIG. 6, step (E) is to provide a second transparent conductive laminated structure 1002. The second transparent conductive laminated structure 1002 comprises a second conductive film 21, a third adhesive layer 22, and a second protective film 23. The second conductive film 21 comprises a second substrate 211, a patterned second conductive layer 212, and a patterned second silver paste layer 213. The preparation method of the second transparent conductive laminated structure 1002 is similar to that of the first transparent conductive laminated structure 1001. The third adhesive layer 22 is identical to the first adhesive layer 12, and the same description need not be repeated.

Figure 7:
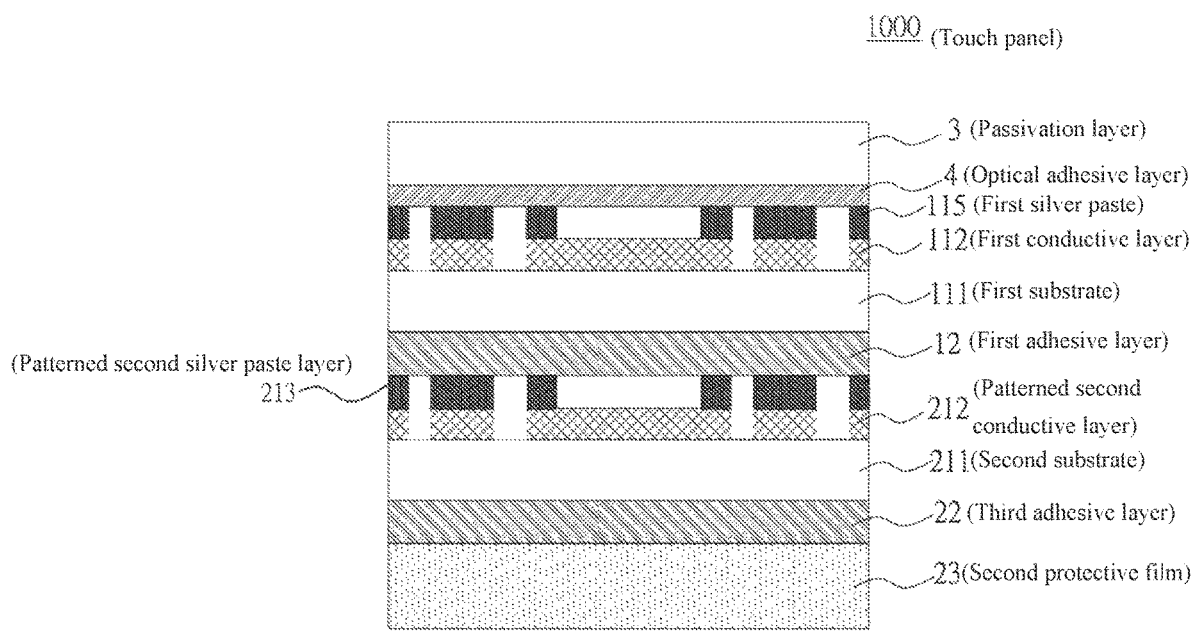
FIG. 7 is a sectional view of the touch panel of the first embodiment of the present disclosure.

At last, as illustrated in FIG. 7, step (F) is removing the first protective film 13 and then laminating the first transparent conductive laminated structure 1001 and the second transparent conductive laminated structure 1002 to complete the preparation of the touch panel 1000. The touch panel 1000 comprises the passivation layer 3, optical adhesive layer 4, the first silver paste 115 (patterned), the first conductive layer 112 (patterned), the first substrate 111, the first adhesive layer 12, the second silver paste 213 (patterned), the second conductive layer 212 (patterned), the second substrate 211, the third adhesive layer 22, and the second protective film 23 in order from top to bottom.

In the following assembly steps of the touch panel 1000 provided by the present disclosure, for example, when attaching the touch panel 1000 onto a display for manufacturing a touch display panel, the second protective film 23 may be removed. The third adhesive layer 22 remaining on the second substrate 211 may provide the adhesion for attaching the touch panel 1000 onto the display panel, other components, or carriers.

More specifically, the touch panel 1000 of the present embodiment has the Glass/Sensor Film X/Sensor Film (GFF) structure. That is, the first conductive layer 112 being patterned in step (C) comprises a first axis touch electrode, and the second conductive layer 212 being patterned in step (E) comprises a second axis touch electrode, wherein the first axis and the second axis are staggered with each other, for example, the first axis and the second axis are vertically staggered with each other.

In the preparation method of the touch panel 1000, the adhesive layer with weaker peeling strength from the protective film is selected for attaching the protective film onto the conductive layer. That is, the adhesive layer is an optical glue releasable from the protective film. Accordingly, the adhesive layer may remain on the substrate and detach with the protective film when removing the protective film. The adhesive layer remaining on the substrate still has adhesion and can be directly used as an adhesive for attaching the conductive film or the touch panel onto a target carrier. Thereby, a new optical glue or water-based glue is not needed. The preparation process of the touch panel may be simplified by reducing the steps of forming and then removing the adhesive layers. Also, the touch panel has excellent optical properties, such as high penetration rate and low haze.

Figure 8:
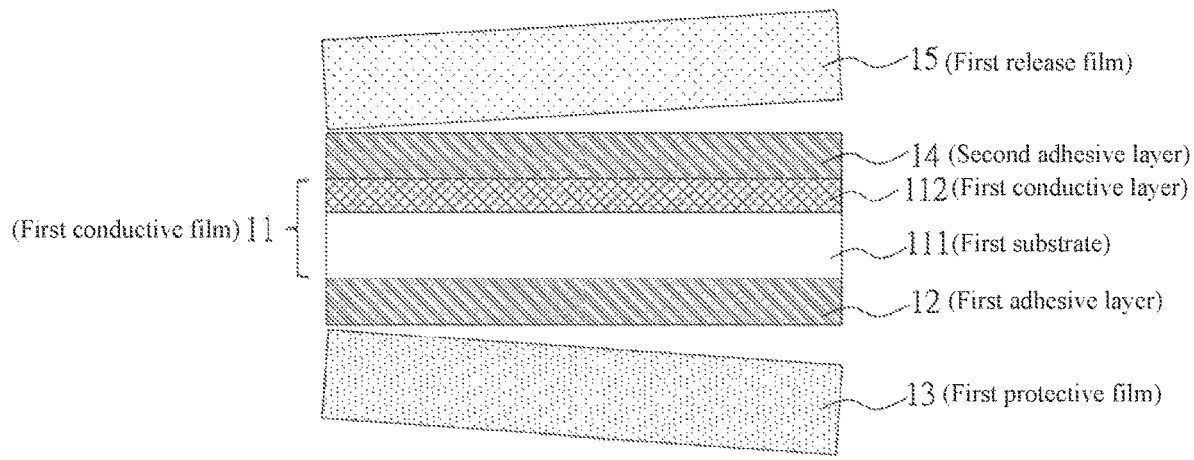
FIG. 8 is a sectional view of the transparent conductive laminated structure of the second embodiment of the present disclosure.

Please refer to FIG. 8, the transparent conductive laminated structure 2001 of the second embodiment of the present disclosure is similar to that of the first embodiment, wherein the transparent conductive laminated structure 2001 mainly comprises a first conductive film 11, a first adhesive layer 12, a first protective film 13, a second adhesive layer 14, and a first release film 15, wherein the first conductive film 11 also comprises a first substrate 111 and a first conductive layer 112. The difference between the present embodiment and the first embodiment is the property of the second adhesive layer 14. In the present embodiment, the peeling strength between the second adhesive layer 14 and the first conductive layer 112 of the first conductive film 11 is greater than the peeling strength between the second adhesive layer 14 and the first release film 15. Specifically, the peeling strength between the second adhesive layer 14 and the first conductive layer 112 should be greater than 15000 mN/25 mm, and the peeling strength between the second adhesive layer 14 and the first release film 15 should be less than 200 mN/25 mm.

In the preparation process of a touch panel using the transparent conductive laminated structure 2001 of the present embodiment, the first protective film 13 is detached from the first adhesive layer 12 when removing the first protective film 13, and the first release film 15 is detached from the second adhesive layer 14 when removing the first release film 15. The first adhesive layer 12 and the second adhesive layer 14 respectively remain on the first substrate 111 and the first conductive layer 112 for attaching the transparent conductive laminated structure 2001 onto other components or carriers.

Figure 9:
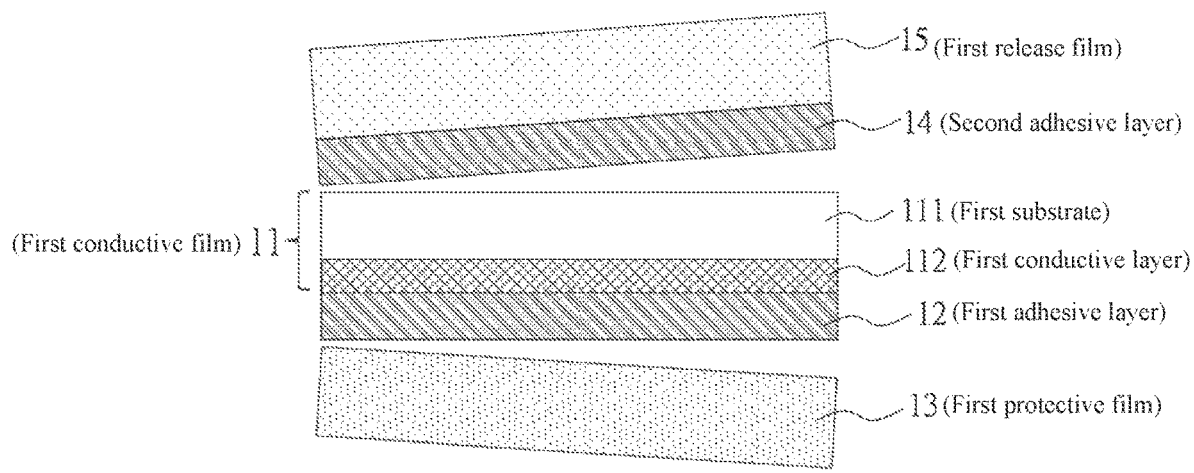
FIG. 9 is a sectional view of the transparent conductive laminated structure of the third embodiment of the present disclosure.

Please refer to FIG. 9, the transparent conductive laminated structure 3001 of the third embodiment of the present disclosure is similar to that of the first embodiment, wherein the transparent conductive laminated structure 3001 mainly comprises a first conductive film 11, a first adhesive layer 12, a first protective film 13, a second adhesive layer 14, and a first release film 15, wherein the first conductive film 11 also comprises a first substrate 111 and a first conductive layer 112. The difference between the present embodiment and the first embodiment is that the direction of the first conductive film 11 of the present embodiment is opposite to that of the first embodiment. That is, the first protective film 13 is attached to the first conductive layer 112 of the first conductive film 11 through the first adhesive layer 12, and the first release film 15 is attached to the first substrate 111 of the first conductive film 11 through the second adhesive layer 14. Besides, in the present embodiment, the peeling strength between the first adhesive layer 12 and the first conductive layer 112 is greater than the peeling strength between the first adhesive layer 12 and the first protective film 13. Specifically, the peeling strength between the first adhesive layer 12 and the first conductive layer 112 should be greater than 15000 mN/25 mm, and the peeling strength between the first adhesive layer 12 and the first protective film 13 should be less than 200 mN/25 mm. The peeling strength between the second adhesive layer 14 and the first substrate 111 is less than the peeling strength between the second adhesive layer 14 and the first release film 15.

Accordingly, in the preparation process of a touch panel using the transparent conductive laminated structure 3001 of the present embodiment, the first protective film 13 is detached from the first adhesive layer 12 when removing the first protective film 13. The first adhesive layer 12 remains on the first conductive layer 112 for attaching the transparent conductive laminated structure 3001 onto other components or carriers in the following assembly processes. However, the second adhesive layer 14 is removed along with the first release film 15 when removing the first release film 15 from the first substrate 111 so that the first substrate 111 is exposed.

Furthermore, in other embodiments, the first conductive layer of the first transparent conductive laminated structure may be a patterned conductive layer. Also, the second conductive layer of the second transparent conductive laminated structure may be a patterned conductive layer.

Experimental Example 1

Figure 10:
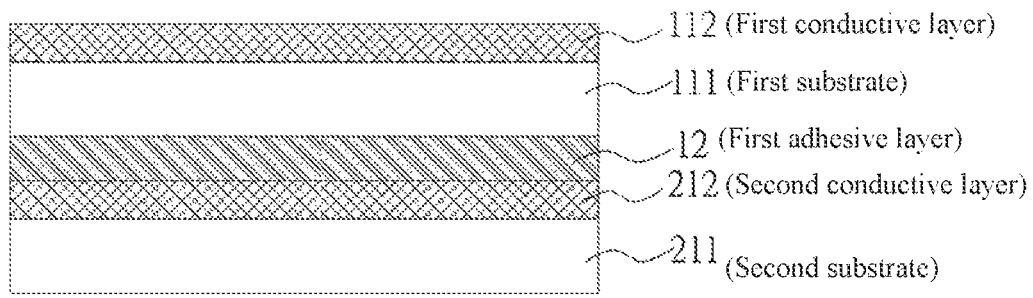
FIG. 10 is a sectional view of the touch panel of the test example of the present disclosure.

Please refer to FIG. 10, the present experimental example provided a touch panel 4000 comprising a first conductive layer 112 (comprising a coating layer), a first substrate 111, a first adhesive layer 12, a second conductive layer 212 (comprising a coating layer), and a second substrate 211 in order from top to bottom. In the present experimental example, the material of the first substrate 111 and the second substrate 211 was PET; the first conductive layer 112 and the second conductive layer 212 were made of a plurality of silver nanowires coated with coating layers; and the first adhesive layer 12 was transparent optical glue. The present experimental example stimulated the heat treatment steps comprised in the preparation process of the touch panel and measured the peeling strength between the second conductive layer 212 and the first adhesive layer 12, and transparency, haze, and b* value of the touch panel 4000 before and after the heat treatment steps. The effects of the heat treatment steps on the peeling strength between the second conductive layer 212 and the first adhesive layer 12, and transparency, haze, and b* value of the touch panel 4000 were observed. The touch panel 4000 in Example 1 did not undergo a heat treatment; the touch panel 4000 in Example 2 was heat-treated at 150° C. for 50 minutes; and the touch panel 4000 in Example 3 was heat-treated at 150° C. for 50 minutes and at 140° C. for 40 minutes. The peeling strength between the second conductive layer 212 and the first adhesive layer 12, and the transparency, haze, and b* value of the touch panel 4000 were measured. The results are shown in Table 1.

TABLE 1

|  | Example 1 | Example 2 | Example 3 |
|---|---|---|---|
| Peeling Strength (mN/25 mm) | 23109 | 22834 | 21853 |
| Average Transparency (T %) | 89.6 | 89.1 | 88.8 |
| AverageHaze (Hz) | 2.92 | 2.92 | 2.92 |
| Average b*value | 3.43 | 3.48 | 3.42 |

The results of the Experimental Example 1 showed that the peeling strength of the adhesive layer was not affected by the heat treatments, and the transparency, haze, and b* value of the touch panel did not significant change. That is, the touch panel provided by the present disclosure still has excellent transparency after heat treatment.

Experimental Example 2

Figure 11:
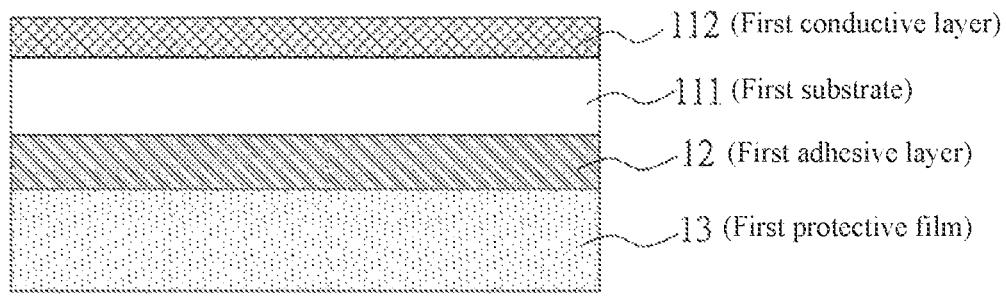
FIG. 11 is a sectional view of the transparent conductive laminated structure of the test example of the present disclosure.

Please refer to FIG. 11, the present experimental example measured the peeling strength between the first adhesive layer 12 and the first protective film 13 of the transparent conductive laminated structure 4001, and evaluated the effect of heat treatment on the peeling strength. The transparent conductive laminated structure 4001 in Example 4 did not undergo heat treatment; the transparent conductive laminated structure 4001 in Example 5 was heat-treated at 150° C. for 50 minutes; and the transparent conductive laminated structure 4001 in Example 6 was heat-treated at 150° C. for 50 minutes and at 140° C. for 40 minutes. The peeling strength between the first adhesive layer 12 and the first protective film 13 was measured and is shown in Table 2.

TABLE 2

|  | Example 4 | Example 5 | Example 6 |
|---|---|---|---|
| Peeling Strength (mN/25 mm) | 115 | 64 | 176 |

The results showed that the peeling strength decreased by 44% in example 5, and increased by 53% in example 6. However, the peeling strength between the first adhesive layer 12 and the first protective film 13 was still less than 200 mN/25 mm; therefore, the first protective film 13 was still releasable from the first adhesive layer 12.

The above disclosure is related to the detailed technical contents and inventive features thereof. People skilled in the art may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

What is claimed is:

1. A transparent conductive laminated structure, comprising:
    a first conductive film comprising a first surface and a second surface opposing the first surface;
    a first adhesive layer disposed on the first surface of the first conductive film; and
    a protective film disposed on the first adhesive layer, wherein a peeling strength between the first adhesive layer and the first conductive film is greater than a peeling strength between the first adhesive layer and the protective film.

2. The transparent conductive laminated structure claimed in claim 1, wherein the peeling strength between the first adhesive layer and the first conductive film is 100 times or more greater than the peeling strength between the first adhesive layer and the protective film.

3. The transparent conductive laminated structure claimed in claim 2, wherein the peeling strength between the first adhesive layer and the protective film is less than 200 mN/25 mm.

4. The transparent conductive laminated structure claimed in claim 1, wherein the first conductive film comprises a first substrate and a first conductive layer disposed on the first substrate, and wherein the first adhesive layer is disposed between the first substrate and the protective film or between the first conductive layer and the protective film.

5. The transparent conductive laminated structure claimed in claim 1, wherein the first conductive film comprises a plurality of silver nanowires.

6. The transparent conductive laminated structure claimed in claim 1, further comprising:
   a second adhesive layer disposed on the second surface of the first conductive film; and
   a release film disposed on the second adhesive layer,
   wherein a peeling strength between the second adhesive layer and the first conductive film is greater than a peeling strength between the second adhesive layer and the release film.

7. The transparent conductive laminated structure claimed in claim 6, wherein the first conductive film comprises a first substrate and a first conductive layer disposed on the first substrate, wherein the first adhesive layer is disposed between the first substrate and the protective film, and wherein the second adhesive layer is disposed between the first conductive layer and the release film.

8. The transparent conductive laminated structure claimed in claim 6, wherein the peeling strength between the second adhesive layer and the first conductive film is 100 times or more greater than the peeling strength between the second adhesive layer and the release film.

9. The transparent conductive laminated structure claimed in claim 8, wherein the peeling strength between the second adhesive layer and the release film is less than 200 mN/25 mm.

10. A touch panel, comprising:
    a first conductive film comprising a first substrate and a first conductive layer disposed on the first substrate;
    a second conductive film disposed beneath the first conductive film and comprising a second substrate and a second conductive layer disposed on the second substrate; and
    a first adhesive layer disposed between the first conductive film and the second conductive film and contacting the first conductive film and the second conductive film,
    wherein a peeling strength between the first adhesive layer and the first conductive film is greater than 15000 mN/25 mm.

11. The touch panel claimed in claim 10, further comprising:
    a protective film; and
    a second adhesive layer disposed between the second substrate and the protective film,
    wherein a peeling strength between the second adhesive layer and the second substrate is greater than a peeling strength between the second adhesive layer and the protective film.

12. The touch panel claimed in claim 11, wherein the peeling strength between the second adhesive layer and the second substrate is 100 times or more greater than the peeling strength between the second adhesive layer and the protective film.

13. The touch panel claimed in claim 11, wherein the peeling strength between the second adhesive layer and the protective film is less than 200 mN/25 mm.

14. The touch panel claimed in claim 10, wherein the first conductive film and the second conductive film respectively comprise a plurality of silver nanowires.

15. The touch panel claimed in claim 10, wherein the first conductive film and the second conductive film are patterned electrode layers.

16. The touch panel claimed in claim 10, further includes an optical adhesive layer and a passivation layer, wherein the passivation layer is attached to the first conductive film by the optical adhesive layer.

* * * * *